J. P. BROPHY.
CHUCK AND SPINDLE MECHANISM.
APPLICATION FILED JAN. 24, 1913.

1,184,068.

Patented May 23, 1916.

WITNESSES=
Oliver M. Kappler.
Horace D. Jay

INVENTOR
John P. Brophy
BY
Fay & Oberlin
ATTORNEYS—

UNITED STATES PATENT OFFICE.

JOHN P. BROPHY, OF CLEVELAND, OHIO.

CHUCK AND SPINDLE MECHANISM.

1,184,068.   Specification of Letters Patent.   Patented May 23, 1916.

Application filed January 24, 1913. Serial No. 743,967.

*To all whom it may concern:*

Be it known that I, JOHN P. BROPHY, a citizen of the United States, and a resident of Cleveland, county of Cuyahoga, and State of Ohio, have invented a new and useful Improvement in Chuck and Spindle Mechanism, of which the following is a specification, the principle of the invention being herein explained and the best mode in which I have contemplated applying that principle, so as to distinguish it from other inventions.

The subject of the present invention is a chuck and spindle mechanism which is adapted to automatically adapt itself to the various irregularities in the stock to be operated upon and at the same time to secure the same in an extremely firm grip. It is a matter of considerable difficulty to adjust the ordinary expansion lathe chuck to engage upon the rough oversize or undersize bar stock for the reason that the varying sizes of the stock tend either to make the grip upon the stock too tight, thereby straining or breaking the operating mechanism, injuring the stock, or not securing a firm enough grip to hold the stock sufficiently tight. The present mechanism is designed to firmly grip the stock even though considerable oversize, undersize or rough, means being provided which automatically adjust themselves to the stock. The invention further provides an extremely easily operated and powerful toggle mechanism for operating the chuck tube.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
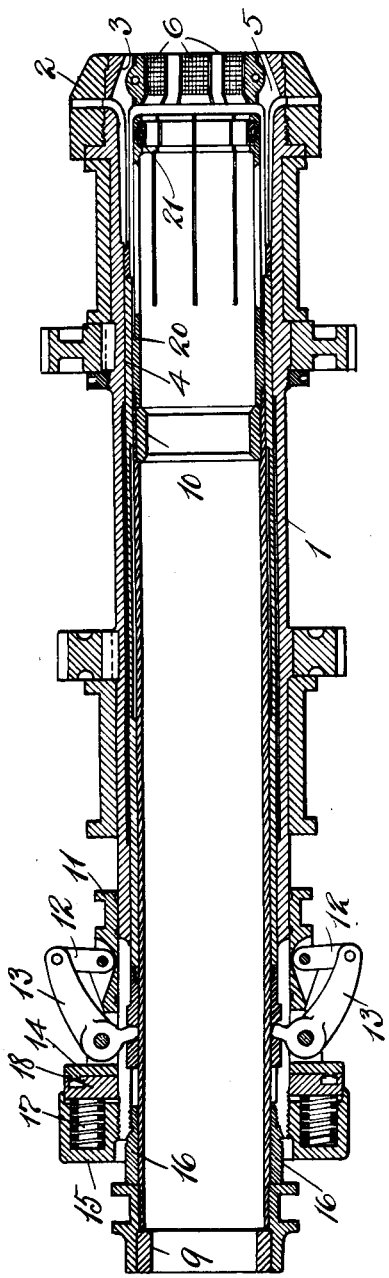
Figure 3:
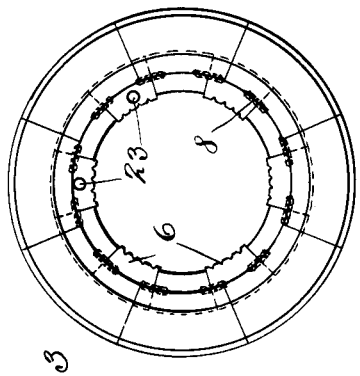
Figure 4:
Figure 6:
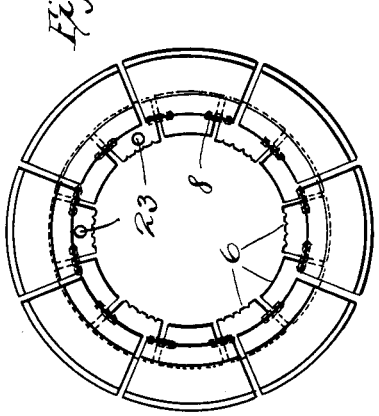

In said annexed drawing:—Figure 1 is a central vertical section through a spindle showing the invention applied thereto; Fig. 2 is an end elevation of the chuck showing the same in its open position; Fig. 3 is a similar view showing the chuck closed; and Fig. 4 is a view in perspective of one of the stock gripping members or pads.

In Fig. 1 there is shown a tubular spindle 1 provided at its outer end with a head 2 in which there is mounted a beveled collar 3. The means for journaling the spindle and for driving the same form no part of the present invention and need not be described in detail. Within the spindle there is slidably mounted a chuck tube 4 and a spring chuck 5, the latter being provided with a series of longitudinal parallel slots and having its extreme outer end beveled to engage against the beveled face 3 on the inside of the head attached to the spindle. It will be seen that the spindle and chuck tube form the usual type of expansion lathe chuck.

The spring chuck 5 of the chuck tube is provided on its inner face with a circular groove adapted to receive a plurality of stock gripping members or pads 6 which have rounded backs and serrated faces adapting them to automatically change their position in the chuck tube head in order to conform to any irregularities in the bar stock. The gripping pads 6 are provided on each lateral face with a recess or aperture 7, the recess being similarly disposed in the adjacent pads and receiving spiral springs 8 of a rigidity sufficient to normally space the pads as shown in Fig. 2. The stock is held in bushings 9 and 10 in a feed tube 20 within the chuck tube 4. Such feed tube is provided with pads 21 which grip the stock and feed it forward. The chuck is operated when the chuck tube is moved to the right, thus closing the chuck, as will be readily understood, and bringing together the various pads into the position shown in Fig. 3, securely gripping the stock, although of course it will be understood that the members 6 need not be in actual contact as they are shown in Fig. 3, as should the stock be slightly larger than the aperture there provided, the stock gripping pads would only come together sufficiently to securely engage the stock.

Slidably mounted upon the spindle is a collar 11 which is recessed and is provided with two upwardly extending pivotally mounted links 12, such links being attached at their upper ends to bell-crank levers 13 which are pivotally mounted in a second collar 14 which is held against a compression collar 15. The shorter end of such bell-crank lever engages a notch formed in the rear end of the chuck tube, and the action of the bell crank and link will be readily understood, it being only necessary to slide the collar 11 to the left to move the chuck tube to the right and engage the front end of the spring chuck 5 with the beveled face 3 of the head 2, thus closing the chuck and securing the stock between the gripping pads.

The compression collar 15 is threaded onto the rear end of the spindle, the latter being engaged internally by a threaded and beveled sleeve 16 which may be adjusted to wedge the end of the spindle against the compression collar, thus securing a safe engagement between the two members. The compression collar is provided with a plurality of stiff coiled springs 17 operating against a disk 18 which is in contact with the collar or sleeve 14 upon which the bell cranks 13 are mounted. The operation of the bell-crank levers through the collar 11 thus operates against a resilient backing consisting of the coiled springs 17 in the compression head. Such resilient backing permits the chuck tube to be forced to the right into its engaging position with extreme force without any danger of breaking the mechanism or injuring the stock as should the movement of the operating means 11 be too great for the size of the stock the excess movement and force will be taken up by the springs in the compression collar. Also it is possible to adjust the compression collar longitudinally on the spindle, thus varying the gripping force of the expansion chuck. The pads may be conveniently assembled in the chuck tube head by forming apertures 23 in the ends of several of the pads 6 which are initially placed adjacent each other. To insert the last few springs and pads a suitable spacing tool is engaged in such apertures 23 and used to hold the pads apart to permit of the introduction of the last pad. The particular construction of the pads, as regards their engaging faces is of little importance, although it will be noticed that I show, and preferably employ, alternate serrated and smooth pads. Similarly the precise means for normally spacing the pads is a matter of individual preference as other means besides coiled springs may be used, although the means here used are extremely efficient and convenient to assemble.

The advantages of my improved mechanism are its adaptability to stock of considerable oversize or undersize, and the security against injury to the stock or the mechanism either by reason of the irregularity in the stock or by reason of an excessive force being used to engage the expansion chuck with the stock.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination of a tubular spindle; a chuck tube slidably mounted therein; an expansion chuck engaging with said spindle upon movement of said tube; a pivotally mounted bell-crank lever having one arm attached to said tube; and a member attached to the other arm of said lever and slidably mounted on said spindle.

2. The combination of a tubular spindle; a chuck tube slidably mounted therein; an expansion chuck engaging with said tube and adapted to engage and be operated by the head of said spindle upon movement of said tube; a pivotally mounted bell-crank lever consisting of a long and a short arm, the short arm being attached to said tube; a sleeve slidably mounted on said spindle; and a link pivotally attached to said sleeve and to the end of such long arm of said bell-crank lever.

3. The combination of a tubular spindle; a chuck tube slidably mounted therein; an expansion chuck engaging with said tube and adapted to engage and be operated by the head of said spindle upon movement of said tube; a sleeve adjustably mounted on said spindle; a plurality of bell-crank levers pivotally mounted on said sleeve, said levers consisting of long and short arms; the short arm of each engaging in a notch in said tube; a second sleeve slidably mounted on said spindle; and a link pivotally attached to said second sleeve and to the ends of such long arms of said bell-crank levers.

4. The combination of a tubular spindle; a chuck tube slidably mounted therein; an expansion chuck engaging with said tube and adapted to engage and be operated by the head of said spindle upon movement of said tube; and means adapted to operate said tube, said means including a sleeve slidably mounted on said spindle; and resilient supporting means for said sleeve, whereby said chuck is permitted to accommodate its closure to the size of said stock.

5. The combination of a tubular spindle; a chuck tube slidably mounted therein; an expansion chuck engaging with said tube and adapted to engage and be operated by the head of said spindle upon movement of said tube; and means adapted to operate said tube, said means including a sleeve slidably mounted on said spindle; an adjustable, resilient supporting means for said sleeve, whereby said chuck is permitted to accommodate its closure to the size of said stock.

6. The combination of a tubular spindle; a chuck tube slidably mounted therein; an expansion chuck engaging with said tube and adapted to engage and be operated by the head of said spindle upon movement of said tube; and means adapted to operate said tube, said means including a sleeve slidably mounted on said spindle; toggle mechanism connecting said sleeve and said tube; and a resilient backing for said toggle mechanism, whereby said chuck is adapted to accommodate its closure to the size of said stock.

7. The combination of a tubular spindle; a chuck tube slidably mounted therein; an expansion chuck engaging with said tube and adapted to engage and be operated by the head of said spindle upon movement of said tube; a collar mounted on said spindle; a sleeve slidably mounted on said spindle; resilient means interposed between said collar and said sleeve; and other means including a lever member pivotally attached to said sleeve, said other means being adapted to operate said tube.

8. The combination of a tubular spindle; a chuck tube slidably mounted therein; an expansion chuck engaging with said tube and adapted to engage and be operated by the head of said spindle upon movement of said tube; a collar adjustably mounted on said spindle; a sleeve slidably mounted on said spindle; springs interposed between said collar and said sleeve; bell-crank levers pivotally mounted on said sleeve, and having one end engaging in a notch in said tube; a second sleeve also slidably mounted on said spindle; and links pivotally attached to the other end of said bell-crank levers and to said second sleeve.

Signed by me, this 22 day of January, 1913.

JOHN P. BROPHY.

Attested by:
 HERBERT M. RICH,
 M. E. GRUTE.